US008352412B2

(12) United States Patent
Alba et al.

(10) Patent No.: US 8,352,412 B2
(45) Date of Patent: Jan. 8, 2013

(54) SYSTEM FOR MONITORING GLOBAL ONLINE OPINIONS VIA SEMANTIC EXTRACTION

(75) Inventors: Alfredo Alba, Morgan Hill, CA (US); Varun Bhagwan, San Jose, CA (US); Tyrone W. A. Grandison, San Jose, CA (US); Daniel F. Gruhl, San Jose, CA (US); Jan H. Pieper, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 12/394,646

(22) Filed: Feb. 27, 2009

(65) Prior Publication Data

US 2010/0223226 A1    Sep. 2, 2010

(51) Int. Cl.
*G06F 17/00* (2006.01)
*G06N 7/00* (2006.01)
*G06N 7/08* (2006.01)

(52) U.S. Cl. ....................................................... 706/55
(58) Field of Classification Search ...................... 706/55
See application file for complete search history.

(56) References Cited

U.S. PATENT DOCUMENTS

| | | | |
|---|---|---|---|
| 7,249,117 B2 | 7/2007 | Estes | |
| 7,337,170 B2 | 2/2008 | Lee et al. | |
| 2002/0120598 A1* | 8/2002 | Shadmon et al. | 707/1 |
| 2004/0049505 A1 | 3/2004 | Pennock | |
| 2005/0132070 A1* | 6/2005 | Redlich et al. | 709/228 |
| 2007/0011134 A1 | 1/2007 | Langseth et al. | |
| 2007/0011175 A1 | 1/2007 | Langseth et al. | |

OTHER PUBLICATIONS

Kato, Yoshikiyo et al "EXtracting the Author of Web Pages" WICOW Oct. 30, 2008. [Online] DOwnloaded from ACM Jan. 12, 2012 http://delivery.acm.org/10.1145/1460000/1458537/p35-kato.pdf?ip=151.207.246.4&acc=ACTIVE%20SERVICE&CFID=76722198&CFTOKEN=62659126&_acm_=1326392806_f4378e0e386086654b93d541eec02e1b.*

Gerber, R., "Slicing Real-Time Programs for Enhanced Schedulability," ACM Transactions on Programming Languages and Systems, vol. 19, No. 3, May 1997, pp. 525-555.

* cited by examiner

*Primary Examiner* — Ben Rifkin
(74) *Attorney, Agent, or Firm* — Gibb & Riley, LLC

(57) ABSTRACT

A system for transforming domain specific unstructured data into structured data including an intake platform controlled by feed back from a control platform. The intake platform includes an intake acquisition module for acquiring data building baseline data related to a domain and problem of interest, an intake pre-processing module, an intake language module, an intake application descriptors module, and an intake adjudication module. The control platform includes a control data acquisition module, a control data consistency collator, a control auditor, a control event definition and policy repository, an error resolver, and an output that outputs results of the workflow into structured data enabled to be used in data analytics.

17 Claims, 12 Drawing Sheets

SYSTEM FOR MONITORING GLOBAL ONLINE OPINIONS VIA SEMANTIC EXTRACTION

BACKGROUND

1. Field of the Invention

The embodiments of the invention generally relate to obtaining unstructured domain specific modality data and transforming it into a structured form that enables further analysis in a failure resistant manner that compensates for multiple error scenarios.

2. Description of the Related Art

The vast amount of continually growing content on the Internet has fostered many approaches to harness the information contained therein. Advanced data mining and text analytics techniques have been developed to perform knowledge gathering and information discovery using Web data.

Data analysis is the process of gathering, modeling, and transforming data with the goal of highlighting useful information, suggesting conclusions, and supporting decision making. Data analysis has multiple facets and approaches, encompassing diverse techniques under a variety of names, in different business, science, and social science domains. Data mining is a particular data analysis technique that focuses on modeling and knowledge discovery for predictive rather than purely descriptive purposes.

Text analytics describes a set of linguistic, lexical, pattern recognition, extraction, tagging/structuring, visualization, and predictive techniques. The term also describes processes that apply these techniques, whether independently or in conjunction with query and analysis of fielded, numerical and categorical data, to solve business problems. These techniques and processes discover and present knowledge—facts, business rules, and relationships—that is otherwise locked in textual form, impenetrable to automated processing. Typical applications scan a set of documents written in a natural language and either model the document set for predictive classification purposes or populate a database or search index with the information extracted. Current approaches to text analytics use natural language processing techniques that focus on specialized domains.

Data gathered from free and public sources on the Web is frequently integrated with enterprise and proprietary data to perform sophisticated analytics. This phenomenon in turn has lead to data analytics technology being in high demand as people try to extract as much value as possible from their most valuable resource—the information around them, whether in their organizations or freely and publicly available. Financial institutions are recognizing that they need to leverage public data and internal information in order to differentiate themselves from their competitors and provide value to their customers and employees. The retail industry is leveraging external consumer data to better enhance their distribution networks and hone their marketing efforts. The focus of all analytics efforts is to extract interesting and often hidden "nuggets" from within the data. In order to do so, however, all of these efforts have to spend a vast amount of time, effort and resources on data acquisition, ingestion, and integration.

Thus, the focus of these efforts tends to tilt away from data analysis and towards data ingestion. Another phenomenon worth observing is that the number of online sources with valuable data that use "broken English" is a lot larger than the number of sources using proper English. As analytics approaches attempt to bring structure to unstructured and semi-structured content, they first have to process broken English. In other words, analytics projects now also have to figure out how to parse and understand broken English, as well as how to consistently and reliably extract useful information from these data sources.

Traditional data analytics projects usually focus on the information question they would like to answer and often fail when confronted with inconsistent data sources, networking problems and machine failures. Companies like Nielsen and even IBM have a multitude of data analytics efforts, which leverage some sort of mechanism for ingest. The ingest mechanisms used in their efforts work well in typical enterprise environments where failure (of both data and system) is an exception rather than the rule, as well as in instances where the ingested content has rich structure (schema) around it. However, as analytics projects move in the direction of unstructured and semi-structured content and away from the (relatively) regulated enterprise environments, more rigorous approaches are required. What is needed is an underlying notion of embracing failure in data ingestion when a system is confronted with inconsistent data sources, networking problems and machine failures.

SUMMARY

In view of the foregoing, disclosed herein is a system for transforming domain specific unstructured data into structured data including an intake platform including an intake acquisition module that acquires structured data, semi-structured data, and associated metadata related to a domain and problem of interest. The intake acquisition module develops baseline data related to a domain and problem of interest from the structured data, semi-structured data, and associated metadata. The intake platform further includes an intake preprocessing module receiving structured and unstructured content related to the domain and problem of interest, an intake language module providing word equivalents to words within the structured and unstructured content according to a domain and problem of interest, an intake application descriptors module providing definitions of key descriptors within the domain and problem of interest, and an intake adjudication module processing the structured and unstructured content using the baseline data, the word equivalents, and the key descriptors to develop a workflow for classifying the structured and unstructured content for the domain and problem of interest. The system further includes a control platform that includes a control data acquisition module that identifies data acquisition and data analysis errors relating to receiving the structured and unstructured content and the classifying of the structured and unstructured content, a control data consistency collator that analyzes states of the data within the workflow to identify state errors, a control auditor that monitors sources of the structured and unstructured content and monitoring the data within the workflow to identify source and processing errors, a control event definition and policy repository that maintains policies for resolving the data acquisition and data analysis errors, the state errors, and the source and processing errors, an error resolver that resolves the data acquisition and data analysis errors, the state errors, and the source and processing errors according to the policies, and an output that outputs results of the workflow, the results of the workflow comprising the structured and unstructured content classified into structured data enabled to be used in data analytics.

Further disclosed herein is a computer-implemented method for transforming domain specific unstructured data into structured data, and programmable storage medium tangibly embodying/for storing a program of machine-readable instructions executable by a digital processing apparatus to perform operations supporting a method of transforming domain specific unstructured and broken language data into structured data for enabling custom data analytics. The method includes acquiring structured data, semi-structured data, and associated metadata related to a domain and problem of interest and develops baseline data related to the domain and problem of interest from the structured data, semi-structured data, and associated metadata. The method receives structured and unstructured content related to the domain and problem of interest and provides word equivalents to words within the structured and unstructured content according to a domain and problem of interest, provides definitions of key descriptors within the domain and problem of interest. Furthermore, the method processes the structured and unstructured content using the baseline data, the word equivalents, and the key descriptors to develop a workflow for classifying the structured and unstructured content for the domain and problem of interest. Thereafter, the method identifies data acquisition and data analysis errors relating to the receiving of the structured and unstructured content and the classifying of the structured and unstructured content, and analyzes states of the data within the workflow to identify state errors. The method further monitors sources of the structured and unstructured content and monitoring the data within the workflow to identify source and processing errors, and maintains policies for resolving the data acquisition and data analysis errors, the state errors, and the source and processing errors. The method resolves data acquisition and data analysis errors, the state errors, and the source and processing errors according to the policies, and outputs results of the workflow, the results of the workflow comprising the structured and unstructured content classified into structured data enabled to be used in data analytics.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

Semantic Extraction

As mentioned above, there remains a need for a system and method for obtaining unstructured domain specific modality data and transforming it into structured form into a form that enables further analysis in a failure resistant manner that compensates for multiple error scenarios.

Figure 1:
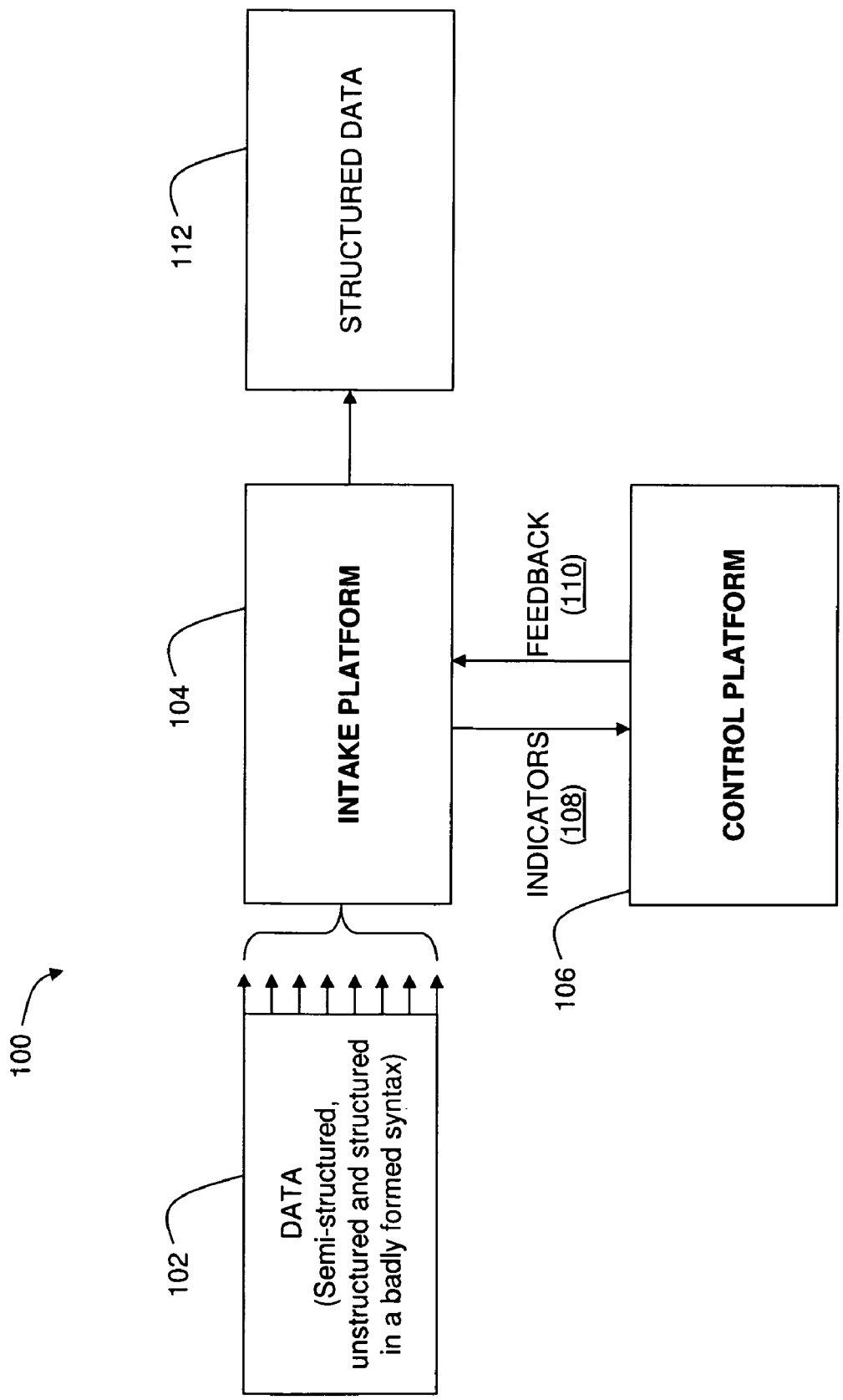
FIG. 1 is a schematic diagram of the present invention.

Conceptually, the system 100 as illustrated in FIG. 1 of the present invention has three possible functional embodiments:

1) A Platform for Worst-Case Scenario Workflow Management built on the assumption that failure happens and it must be handled quickly and seamlessly, such that it does not stop or hinder information ingest. As such a control framework that can detect and implement corrective actions is developed and disclosed.

2) A Platform for Community-Based Information Extraction around specific phenomenon that can be fed into statistical analysis tools. This includes the data acquisition, preliminary Extract, Transform and Load (ETL) tooling as well as "broken English" Natural Language Processing (NLP) type spotters needed in these domains.

3) A suite of technologies that a user can plug domain knowledge cartridges into and that outputs data suitable for Online Analytical Processing (OLAP) or Business Intelligence (BI) consumption. One inputs small amounts of domain knowledge that involves pulling in unstructured, semi-structured and structured data, wherein the present invention converts it all into a structured form.

The present invention includes an ingestor intake platform 104, e.g., a crawler, being the foundation that can be used to build a workbench, a visualization, an advanced analytics application, a software stack, a search tool or platform, a Business Intelligence (BI) tool, a data/text mining platform or a distributed computing platform. At the lowest level, the present invention is a library of specialized software components, (e.g., 200-208 in FIG. 2), and a computer-implemented control flow mechanism, e.g., control platform 106.

The advantages of the present invention speed up development of new technology in a targeted space, which means faster development due to focus on the core issues rather than focusing on building domain specific ingest technology. The speeding up of technology transfer means a faster transfer out of research and development to customers in a sustainable manner. Additional advantages provide a reusable platform which reduces the financial and technical challenges in quickly developing and deploying text analytics applications, and detecting and responding to failures quickly since the control flow is generic across all applications and domains. Furthermore, a customizable application for instances in many different domains is provided while handling real-world text, with poor syntax, little structure or grammar, i.e., broken English, and provides data that can be used by many tools or projects and is a Business Intelligence Enabler, thereby providing clean, consistent data sets over time over a domain of interest.

The present invention technology may be suitably implemented in domains where Proper Language Analysis (i.e., traditional NLP) doesn't work and one needs to apply heuristics on the fly, in Data-Driven Agile Development Environments by enabling agile deployment, which facilitates iterative and incremental development since the data gathered from the sources go in the development process cycle in real-time, and when the ingestion, pre-processing and rudimentary analysis of poorly formatted data is not the focus of the effort or project.

Herein is described a system and method which allows agile data driven development of systems to harness unstructured data from multiple unreliable sources, providing the transformation of potentially broken English unstructured sources into well formed data sets for further analysis. It addresses both these problems and allows technology to move quickly and in a sustainable manner from prototype to development (or from research to production) with far less hiccups than before. The primary strength of the present invention is that it assumes an imperfect world of data, i.e., bad grammar, unintelligible phrasing, shorthand, data source failures and fluctuations, processing chain breaks, etc. Murphy's Law is assumed in data collection, i.e., that data failure will happen and, more specifically, the worse case scenario will probably occur. The present invention allows for the acquisition and processing of information in this environment by providing workflow and domain cognizant analytic tools which allow the creation and maintenance of custom data acquisition modules.

By focusing on ensuring end-to-end quality of service for data analytics applications and enabling the development of custom data analytics solutions rapidly and with a high tolerance for failure, this technology paves the way for relatively painless transition and deployment of sophisticated applications to production environments.

The embodiments of the present invention generally transform unstructured domain specific data into structured data by applying policies from a control platform to specific software ingestor modules of an intake platform. The most basic level the present invention is a software library (intake modules 200-208 of FIG. 2) with a computer-implemented control platform 106 supporting code for policies applied to the intake modules for control flow monitoring, analysis and correction.

Figure 2:
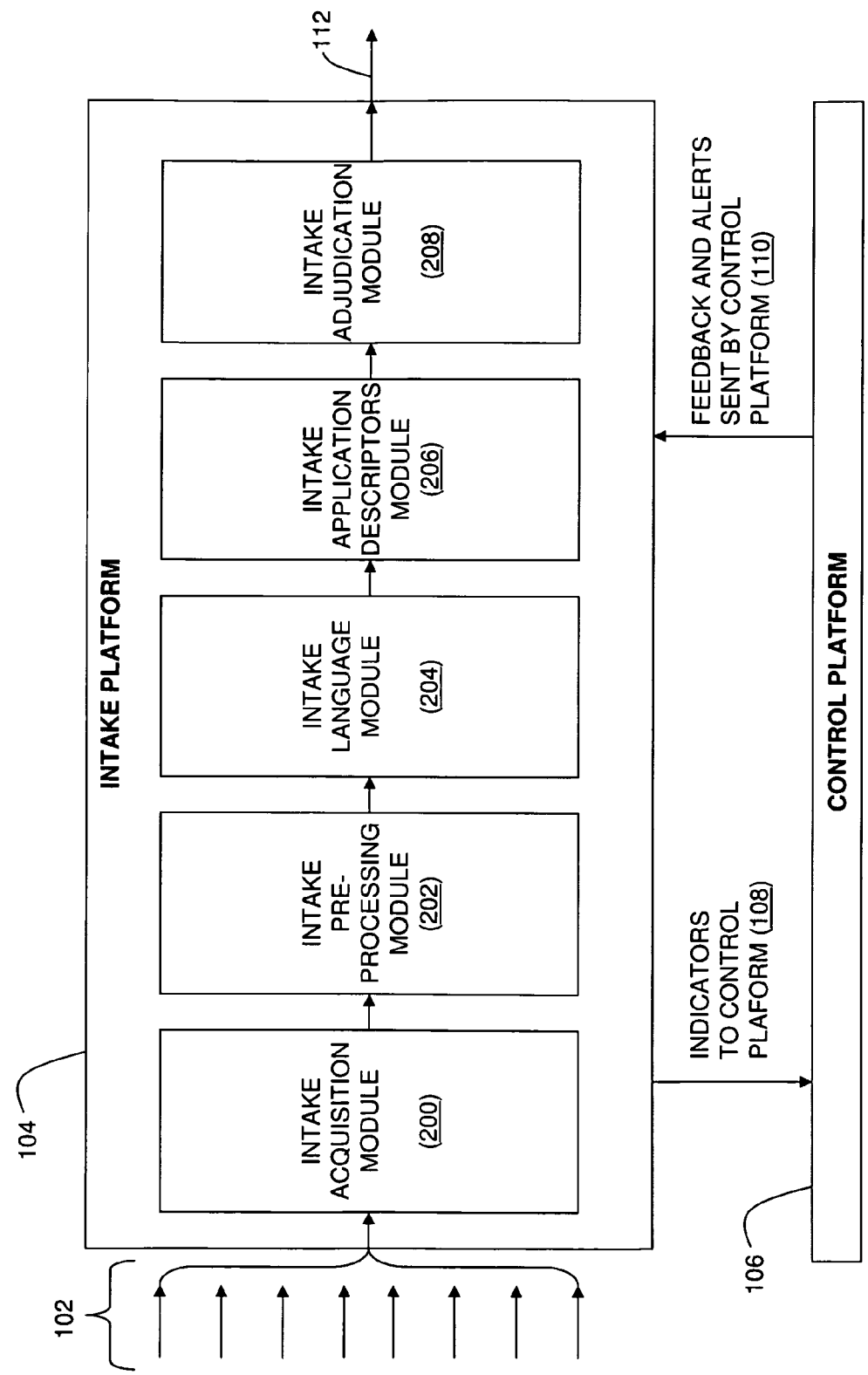
FIG. 2 is a schematic diagram of the intake platform of the present invention.

FIG. 1 illustrates the present invention system consisting of an Intake Platform 104 ingesting semi-structured, unstructured and structured in a badly formed syntax data 102 and a control platform 106 receiving execution state, throughput and consistency data collection indicators 108 from all intake component modules (200-208, see FIG. 2). Control Platform 106 transmits feedback and alerts 110 including control platform behavior and topology feedback to intake component modules 200-208. Intake platform 104 then outputs structured data 112 based on the intake platform 104 component modules 200-208 being controlled by and receiving the feedback and alerts 110 of the control platform 106.

The high-level use case scenario for the present invention is simple. The user of the present invention technology includes the intake module library 200-208 in an ingestor code. The user can leverage a series of modules 200-208, as depicted in FIG. 2, to determine the particular information flow for the application they are developing. The user also tells the system 100 the form and content of the data 112 they wish to have output. In leveraging the intake modules 200-208, the user obtains a fault-tolerant platform that ingests data 102 irrespective of what happens either with the data sources or with the processing chain. Activity is monitored by the control platform 106, which analyzes the system and source state and takes corrective action as necessary.

The Intake Platform

Intake Platform 104 includes intake software modules 200-208, as illustrated in FIG. 2, and may include five different functional categories.

1) Intake Acquisition Module (IAM) 200 may be used as base constructs to build specialized ingestors for a domain of interest. In so doing, the effort required to create these ingestors is reduced. These IAMs may be pointed at websites, forums and feeds that provide a window into user opinions, behavior and preferences, and that this data may be additionally supplemented by corresponding user demographics. Structured and semi-structured repositories relevant to the domain and application being investigated may be used to provide baseline data. Thus, the IAMs may contain specialized data ingestors having specific data templates for specific domains, such as, e.g., automotive or music industries.

2) Intake Pre-Processing Module (IPM) 202 extracts individual comments, posts, discussion points, profiles and counts from the ingested data and processes the unstructured content to determine spam and identify on-topic and off-topic information.

3) An Intake Language Module (ILMs) 204 allows jargon of a domain of interest to be included. Dictionaries for terminology in healthcare, media and entertainment, law, automobiles, politics, etc., are included in these modules.

4) Intake Application Descriptors Module (IADMs) 206 allows the definition of key descriptors (or relevant notions of interest) for a domain and problem of interest. For example, in the music industry, "Listens," "Views," and "Comments" are notions of interest. For cars, "Fuel Economy," "Acceleration," "Handling," "Space" and "Safety" would be relevant notions. In politics, "Integrity," "Record," and "Funds" would be other of the notions of interest.

5) Intake Adjudication Module (IADJM) 208 contains a tunable ranked list producer algorithm that combines multimodal information in a way that is meaningful for a business task being analyzed. The IADJMs may be informed by Voting Theory and evaluation metrics based on domain and customer needs. In one instance, for example, in the music industry, the system may consistently and reliably retrieve data from a number of partner web sites where there are two data types: structured data, which is pre-processed data (often based on logs kept by our partners, such as the top 600 songs listened to on LastFM), and unstructured data, which is usually natural text (such as user comments from MySpace). Unstructured data requires an additional processing step called spotting that determines which artist or track is being talked about. This process involves checking against an authoritative information source for music artists and tracks. All data is formatted by post-crawl processing for import into a database with the following columns, for example: Source, Artist, Track, Date, and Count. The output files are placed into a special system directory, where they are picked up every half hour by the database importer.

Every predetermined period, e.g., every "n" hours, new deliverable structured data 112 is output by the system 100. The fact this process continues systemically and without fail is due to the Control Platform (FIG. 3), hereafter referred to as the CP.

The Control Platform

Control Platform (CP) 106, (see FIG. 3), may be a Web-based network system monitoring tool, (for example, a Nagios-based implementation), which performs workflow analysis and general system monitoring. The purpose of the CP is to reduce the Total Cost of Ownership (TCO) of systems both as they are developed and after they transfer either from prototype to development or from research to production. This is accomplished by providing the following general functionality of standard error reporting, standard data analytics corruption and consistency reporting, data acquisition layer execution state, data integrity and source accessibility assertion, and, system wide data volume monitoring to ensure an increasingly monotonic data stream.

Control Data Acquisition Module (CDAM) 300 actively collects operations data from the system components through the Web Based network and provides the following functionality of reporting on:
 standard data acquisition layer errors;
 protocol related error codes, e.g., HTTP error codes, socket timeouts, etc.;
 data source response times;
 semantic extraction failure codes, e.g., pages missing error pages with valid protocol codes etc.;
 parsing error codes, e.g., due to format changes related to screen scrapers page content changes or API unannounced evolution;
 data processing error codes, e.g., aggregation errors, unexpected data type errors, etc.;
 data output integrity checks;
 data corruption error codes; and
 data consistency on a per modality basis (monotonic versus non monotonic modalities).

Control Data Consistency Collator (CDCC) 302 consumes the data collected by the CDAM, over the Web based Network, in order to support the following functionality of:
 execution of state assertion;
 associated source accessibility state assertion;
 standardized reporting of acquired data volumes and output data volumes;
 standardized outputting integrity checks;
 standardized acquisition integrity checks;
 functional state monitoring per processing unit;
 data throughput per processing unit;
 overall data volume analysis; and
 analytics processing capacity high watermark.

Control Auditor (CA) 304 consumes the data acquired by the CDAM and the information produced by the CDCC, over the web based network, and ensures:
 data presence per source, (minimum data volumes expected per source over the specified time increment);
 data presence per modality, (data consistency checks on expected modalities on a per source basis);
 data flow volumes, (scalability of the control data store 306 and scalability of a cube producing subsystem, i.e., the process of populating an analytical server database with data from the relational database);
 data store integrity, (insertion data flow and throughput, and utilization of high watermark, and capacity and functional state); and
 post processing data consistency checks.

Control Event Definition and Policy Repository (CEDPR) 308, consumes the events generated by the CA and takes actions based on the current policies, and has the following features:
 an event definition repository, which contains the event definitions, event severities and priorities and the event types;
 a policy repository, which contains the action policies for events and the conflict resolution policies;
 a component feedback component 310, which executes, by issuing commands to the corresponding components over the Web Based network on the advice of the auditor based on current policies; and
 operator feedback component 312, which executes on unrecoverable exceptions, by issuing electronic notifications to the operations team over the Web Based Network, and/or the advice of the auditor based on current policies.

In the same instance of the embodiment of this invention discussed above, the CP 106 may be instantiated, for example, as a Nagios application, where a Web-based network system monitoring tool having a web-based user interface 314 that can be customized to monitor components. Each of the checks and components presented in the CP above is hard-coded using Web-based network system monitoring tool as the delivery platform.

Herein is disclosed a system 100 for transforming domain specific unstructured data into structured data 102, the system 100 including an intake platform 104 and a control platform 106, where indicators 108 are transmitted from components 200-208 within the intake platform 104 and feedback 110 is transmitted from the control platform 106 to respective components 200-208 within the intake platform 104.

The intake platform 140 includes an intake acquisition module 200 that acquires structured data, semi-structured data, and associated metadata (102 collectively) related to a domain and problem of interest, the intake acquisition module 200 develops baseline data related to the domain and problem of interest from the structured data, semi-structured data, and associated metadata 102. The intake acquisition module 200 is directed toward websites, forums, feeds proprietary repositories, etc., which provide user opinions, behavior and/or preferences. These user opinions, behavior and/or preferences may be supplemented by user demographics, domain and/or application relevant structured and semi-structured repositories used to provide the baseline data.

The intake platform 140 further includes an intake pre-processing module 202 that receives the structured and unstructured content 102 related to the domain and problem of interest.

The intake platform 140 further includes an intake language module 204 that provides word equivalents to words within the structured and unstructured content 102 according to a domain and problem of interest.

The intake platform 140 further includes an intake application descriptors module 206 that provides definitions of key descriptors within the domain and problem of interest.

The intake platform 140 further includes an intake adjudication module 208 that processes the structured and unstructured content 102 using the baseline data, the word equivalents, and the key descriptors to develop a workflow for classifying the structured and unstructured content for the domain and problem of interest.

Figure 3:
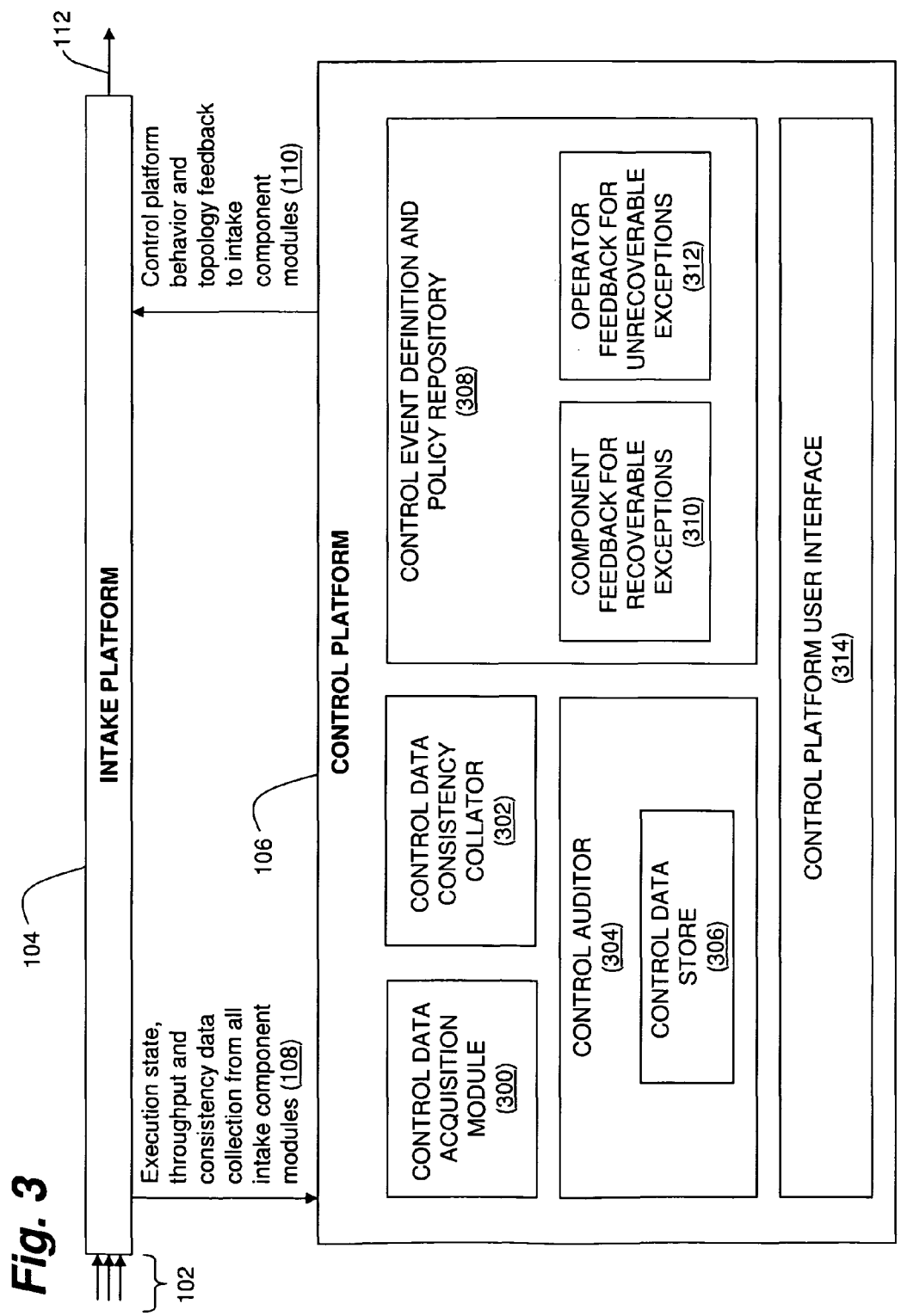
FIG. 3 is a schematic diagram of the control platform of the present invention.

The control platform 106 (as shown in FIG. 3) includes a control data acquisition module 300 that identifies data acquisition and data analysis errors relating to the receiving of the structured and unstructured content 102 and the classifying of the structured and unstructured content 102. The control data acquisition module 300 provides reporting standard data acquisition layer errors, protocol related error codes, data source response times, semantic extraction failure codes, parsing error codes, data processing error codes, data output integrity checks, data corruption error codes and/or data consistency.

The control platform 106 further includes a control data consistency collator 302 that analyzes states of the data within the workflow to identify state errors. The control data consistency collator 302 further executes state assertion and associated source accessibility state assertion, and provides standardized reporting of acquired data volumes and output data volumes and standardized output integrity checks and standardized acquisition integrity checks, provides a functional state monitoring per processing unit, provide data throughput per processing unit, provides data volume analysis, and/or provides analytics processing capacity high watermark.

The control platform 106 further includes a control auditor 304 monitoring sources of the structured and unstructured content and monitoring the data within the workflow to identify source and processing errors. The control auditor 302 further ensures data presence per source, wherein the data presence per source is minimum data volumes expected per source over a specified time increment, data presence per modality, such that there are data consistency checks on expected modalities on a per source basis, data flow volumes, including scalability of the data store 306 and scalability of the cube producing subsystem, data store integrity, such as the insertion data flow and throughput, utilization high watermark, capacity and functional state, and/or post processing data consistency checks.

The control platform 106 further includes a control event definition and policy repository 308 maintaining policies for resolving the data acquisition and data analysis errors, state errors, and source and processing errors.

The control platform 106 further includes an error resolver that includes component feedback recoverable exceptions 310 and operator feedback for unrecoverable exceptions 312 that resolves data acquisition and data analysis errors, state errors, and source and processing errors according to the policies of the policy repository 308. The component feedback component 310 that executes advice of the control auditor 304 based on issues having no solutions.

Finally, an output outputs results 112 from the intake platform 104 of the workflow, the results of the workflow comprising the structured and unstructured content classified into structured data enabled to be used in data analytics.

The embodiments of the invention can take the form of an entirely hardware embodiment, an entirely software embodiment or an embodiment including both hardware and software elements. A preferred embodiment of the invention is implemented in software, which includes but is not limited to firmware, resident software, microcode, etc.

Figure 4A:
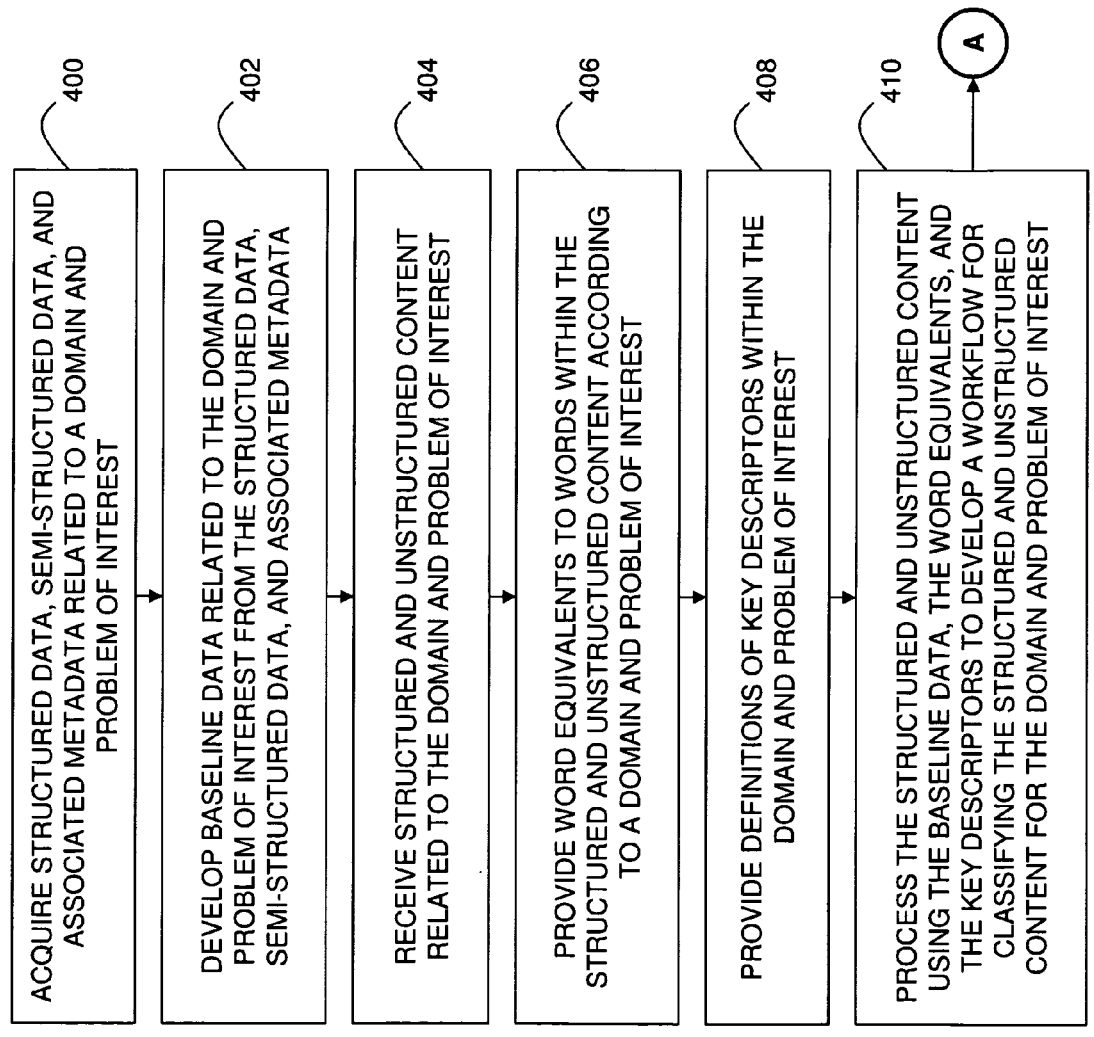
FIG. 4A is a logic flowchart of a method of operating the present invention.
Figure 4B:
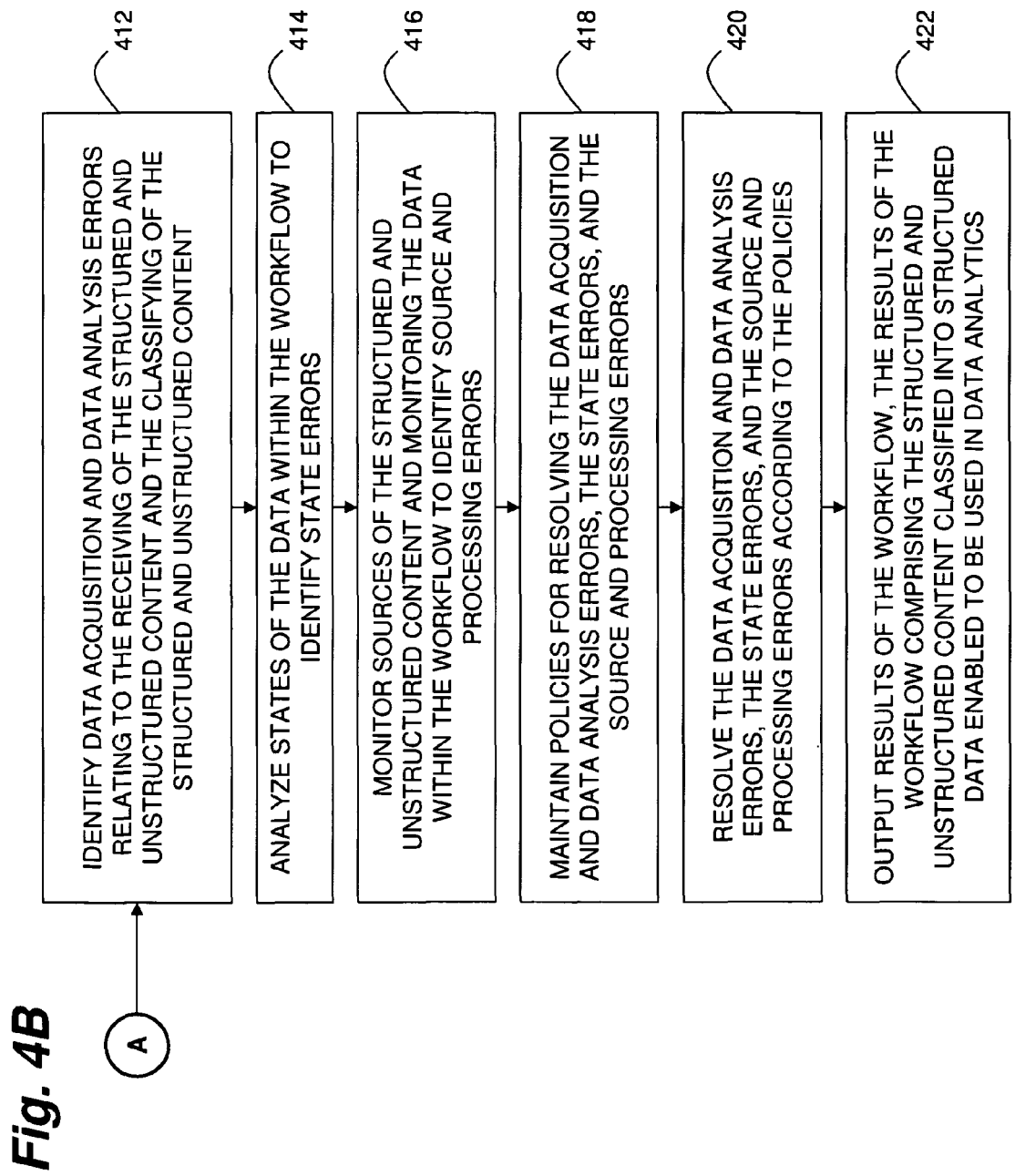
FIG. 4B is a continuation of the logic flowchart of FIG. 4A of a method of operating the present invention.

FIGS. 4A-4B illustrate a computer-implemented method for transforming domain specific unstructured data into structured data, wherein the system performs acquiring 400 structured data, semi-structured data, and associated metadata related to a domain and problem of interest and developing 402 baseline data related to the domain and problem of interest from the structured data, semi-structured data, and associated metadata. Structured and unstructured content is received 404 related to the domain and problem of interest and word equivalents to words are provided 406 within the structured and unstructured content according to a domain and problem of interest. Definitions of key descriptors are provided 408 within the domain and problem of interest, and the structured and unstructured content are processed 410 using the baseline data, the word equivalents, and the key descriptors to develop a workflow for classifying the structured and unstructured content for the domain and problem of interest. Data acquisition and data analysis errors are identified 412 relating to the receiving of the structured and unstructured content and the classifying of the structured and unstructured content and the states of the data are analyzed 414 within the workflow to identify state errors. Sources of the structured and unstructured content are monitored 416 and the data is monitored within the workflow to identify source and processing errors, and policies are maintained 418 for resolving the data acquisition and data analysis errors, state errors, and source and processing errors. Thereafter resolving 420 the data acquisition and data analysis errors, the state errors, and the source and processing errors according to the policies (from 418), and finally, outputting 422 results of the workflow, the results of the workflow comprising the structured and unstructured content classified into structured data enabled to be used in data analytics.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 5:
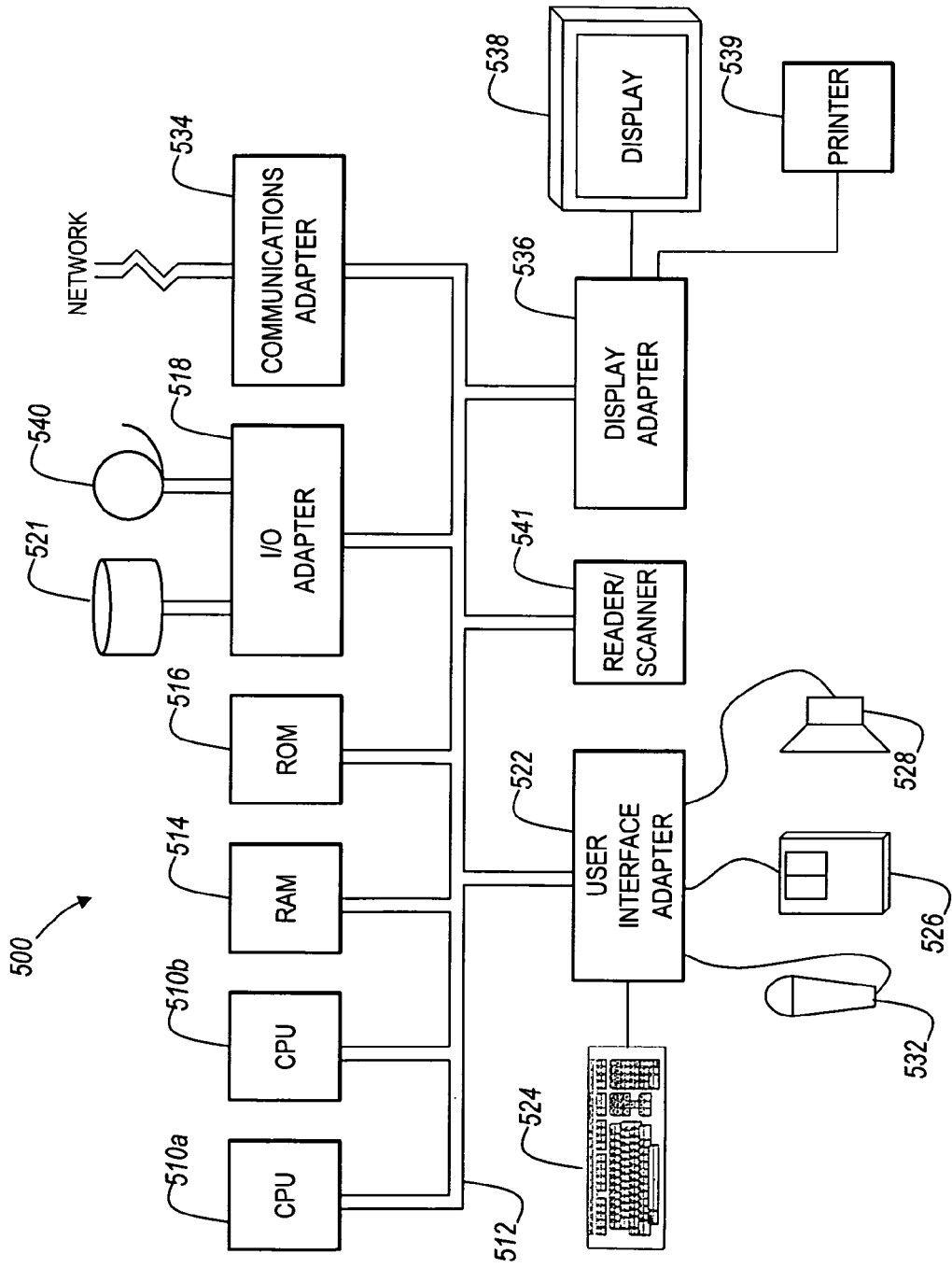
FIG. 5 is a schematic diagram illustrating an exemplary hardware environment that can be used to implement the embodiments of the invention.

Referring now to FIG. 5, system 500 illustrates a typical hardware configuration which may be used for implementing the system and method which allows agile data driven development of systems to harness unstructured data from multiple unreliable sources, providing the transformation of potentially broken English unstructured sources into well formed data sets for further analysis. The configuration has preferably at least one processor or central processing unit (CPU) 510a, 510b. The CPUs 510a, 510b are interconnected via a system bus 512 to a random access memory (RAM) 514, read-only memory (ROM) 516, input/output (I/O) adapter 518 (for connecting peripheral devices such as disk units 521 and tape drives 540 to the bus 512), user interface adapter 522 (for connecting a keyboard 524, mouse 526, speaker 528, microphone 532, and/or other user interface device to the bus 512), a communication adapter 534 for connecting an information handling system to a data processing network, the Internet, and Intranet, a personal area network (PAN), etc., and a display adapter 536 for connecting the bus 512 to a display device 538 and/or printer 539. Further, an automated reader/scanner 541 may be included. Such readers/scanners are commercially available from many sources.

In addition to the system described above, the embodiments of the invention may include a computer-implemented method for performing the above method. As an example, this method may be implemented in the particular environment discussed above. Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method. Such a method may be implemented, for example, by operating the CPU 510 to execute a sequence of machine-readable instructions. These instructions may reside in various types of signal bearing media. Thus, this aspect of the present invention is directed to a programmed product, comprising signal-bearing media tangibly embodying a program of machine-readable instructions executable by a digital data processor incorporating the CPU 510 and hardware above, to perform the method of the embodiments of the invention.

Figure 6:
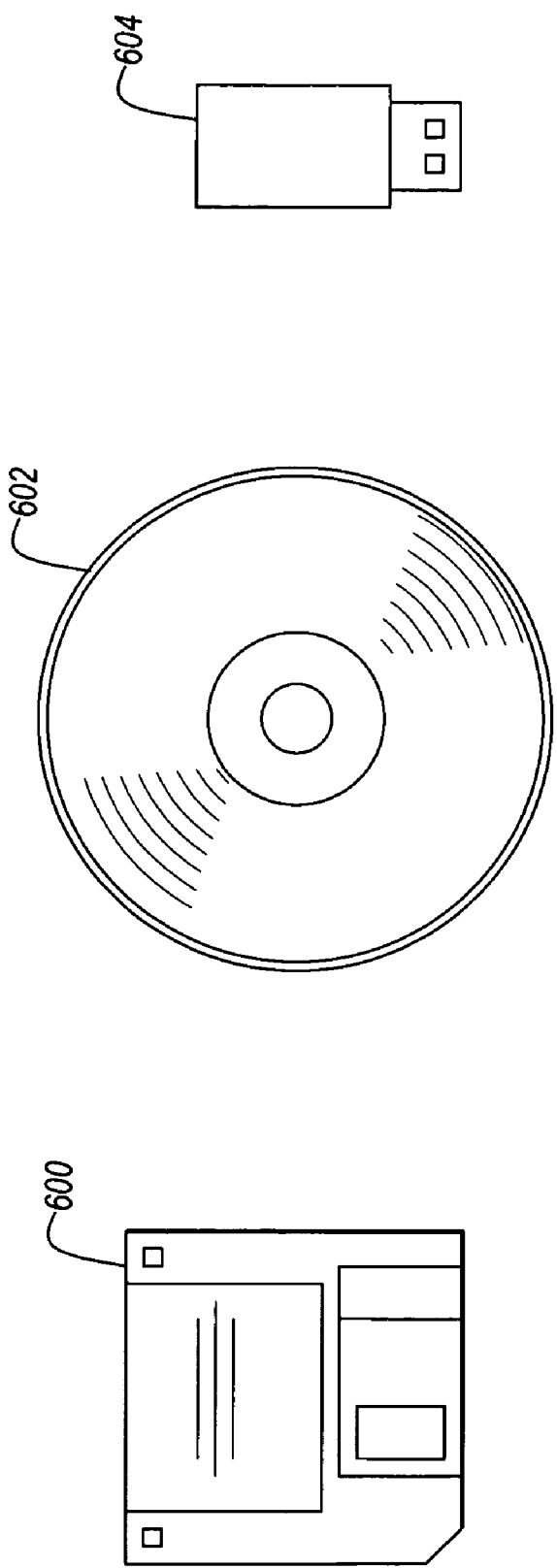
FIG. 6 is a schematic diagram illustrating computer storage mediums that can be used to store implement computer-implemented instructions to carry out the methods of the embodiments of the invention.

This signal-bearing media may include, for example, a RAM contained within the CPU 510, as represented by the fast-access storage for example. Alternatively, the instructions may be contained in another signal-bearing media, such as a magnetic data storage diskette 600, CD-ROM 602 or "plug-and-play" memory device 604, like a USB flash drive, as illustrated in FIG. 6, directly or indirectly accessible by the CPU 510. Whether contained in the computer server/CPU 510, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

Content and Context Analysis of Text

Related to semantics analysis, a need exists for determining the relevancy of comments in electronic text. For example, many online forums or websites include posts from companies that are advertisements for a product or service. These posts are typically irrelevant to the discussion or the forum. Therefore, a need exists for a system to determine which posts in an online forum are advertisements or irrelevant postings. In one embodiment, semantic analysis is performed on discussions regarding music. While the disclosure describes forums and discussions regarding music as one environment, the invention should not be limited to one specific embodiment or environment. It would be apparent to one skilled in the art how to apply the description to other environments or embodiments.

For discussions on music, such as forums discussing artists, genres, albums, etc., up to half of the posts may be advertisements or posts unrelated to a conversation. Hence, in one embodiment, the system determines posts that are clearly irrelevant, clearly advertisements, and clearly legitimate posts. In order to determine if a post falls into one of the categories, a plurality of tests are performed on the post. The tests examine the content of a post and/or the context of a post. The content is the sequence of words that make up the post. The context is the environment for which the post exists.

In an embodiment of a rule-based system, each of a corpus of posts are categorized. The corpus of posts are the posts within a forum, on a site, or a general collection, wherein the posts are initially connected to a specific theme, (e.g., one artist, album, genre, or current event). The categories for the posts include, but are not limited to, irrelevant posts and relevant posts to the corpus. In one embodiment, irrelevant posts are divided into advertising posts and non-advertising posts.

Figure 7:
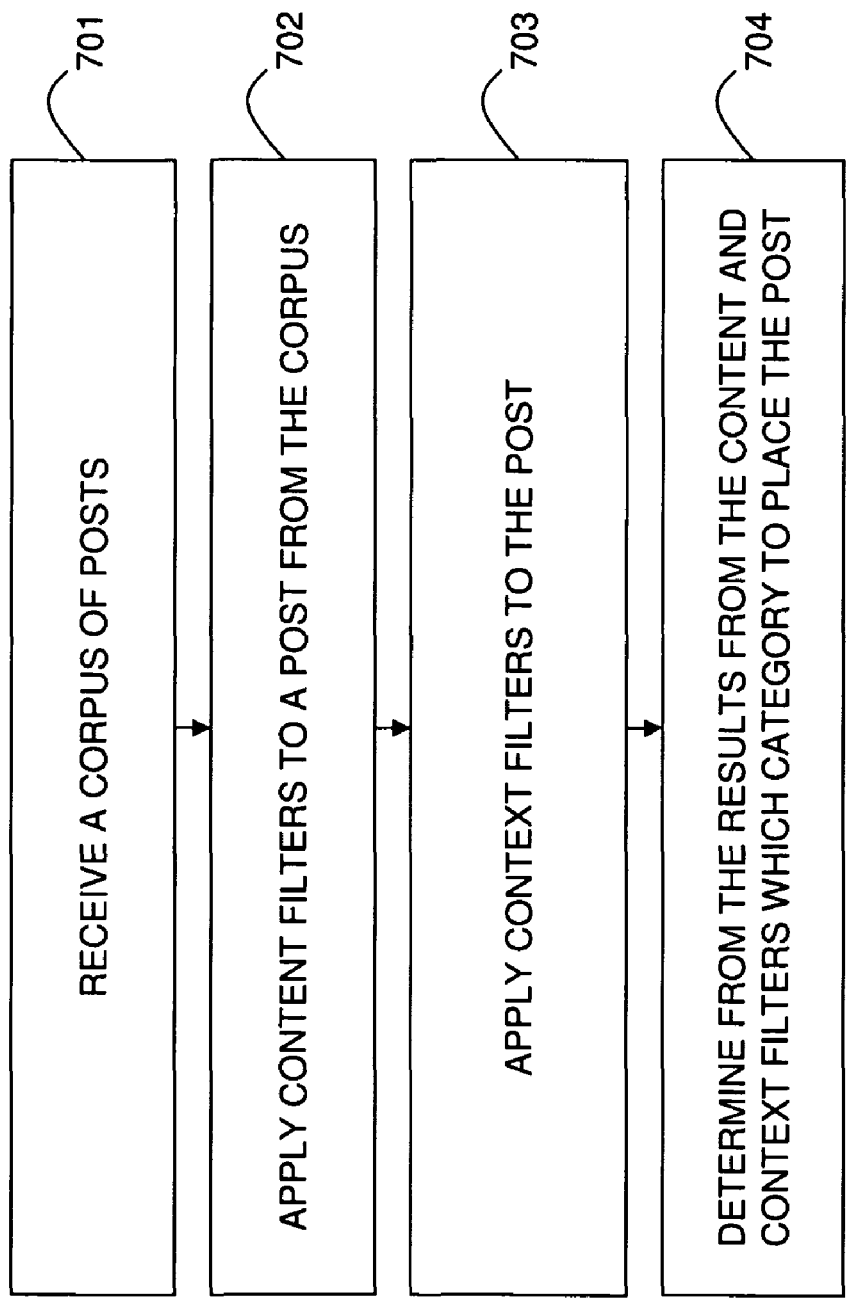
FIG. 7 is a logic flowchart of a method for categorizing a post within the corpus of posts.

FIG. 7 illustrates an example method for categorizing a post within the corpus of posts. Beginning at 701, the system receives a corpus of posts to categorize. In one embodiment, each post of the received corpus is initially set as being relevant to the corpus. Proceeding to 702, the system applies content filters to a post in the corpus.

Figure 8:
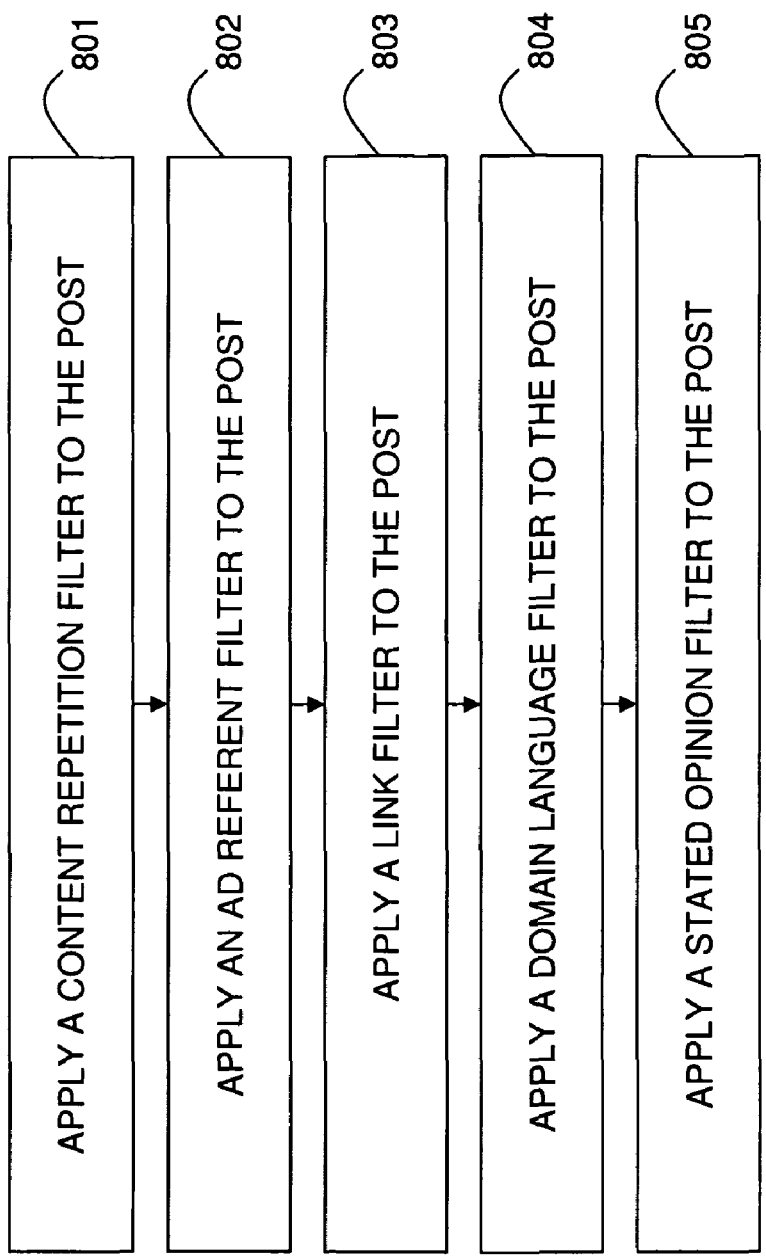
FIG. 8 is a logic flowchart of a method for applying a plurality of content filters to the post illustrated in FIG. 7.

FIG. 8 illustrates an example method for applying a plurality of content filters to the post in 702 of FIG. 7. Beginning at 801, the system applies a content repetition filter to the post in the corpus. In one embodiment, the content repetition filter removes repeated language from a post. For example, if the post being analyzed includes the language, "I love you I love you I love you I love you," the system would truncate the repeated language to one instance of, "I love you." The filter thus reduces the size of posts and decreases subsequent processing time.

Proceeding to 802, the system applies an ad referent filter to the post. The ad referent filter searches for phrases that are predefined as introducing off topic ideas. For example, if a post states, "Check out this band," the phrase "check out" is a common phrase that introduces an off topic idea. In one embodiment, an index of predetermined phrases is stored by the ad referent filter. The index may be updated when phrases are to be included or removed. Thus, when the ad referent filter is applied to the post, the filter compares the language of the post with the index in order to identify phrases within the post. If a phrase is identified, the filter indicates to the system that the post may be off topic. For example, the filter may provide a relevancy score to the system.

Proceeding to 803, the system applies a link filter to the post. In one embodiment, the link filter determines if a post includes a link to a different web site. If the post includes a link to an off site page, then the filter indicates to the system that the post may be an advertisement. Proceeding to 804, the system applies a domain language filter to the post. In the specific example, domain language is music language, but domain language could be of anything of topic, such as communities, video games, movies, sports, colleges, etc. In one embodiment, the domain language filter includes an index of music terms that if used would imply that music is legitimately being discussed. The index includes predetermined terms that are part of the music language. Example terms include, but are not limited to, CD, listen, concert, radio, sing, play, guitar, drums, microphone, instrument, and speakers. The index may be updated, e.g., to include newly found terms. The domain language filter compares the language of the post with the terms in the index. If enough terms exist in the post (e.g., a predetermined number of terms exist in the post or a percentage of the words in the post is in the index), then the filter indicates to the system that the post may be a post relevant to the corpus.

Proceeding to 805, the system applies a stated opinion filter to the post. Posts with stated opinions are typically posts relevant to the corpus. In one embodiment, the stated opinion filter includes an index of known slang and language constructs that accompany a personal opinion. Example language constructs include, but are not limited to, "bad, good, awesome, cool, etc." The stated opinion filter thus compares the language of the post with the constructs in the index. If the filter finds constructs in the index in the language of the post, the stated opinion filter indicates to the system that the post may be relevant to the corpus.

Figure 9:
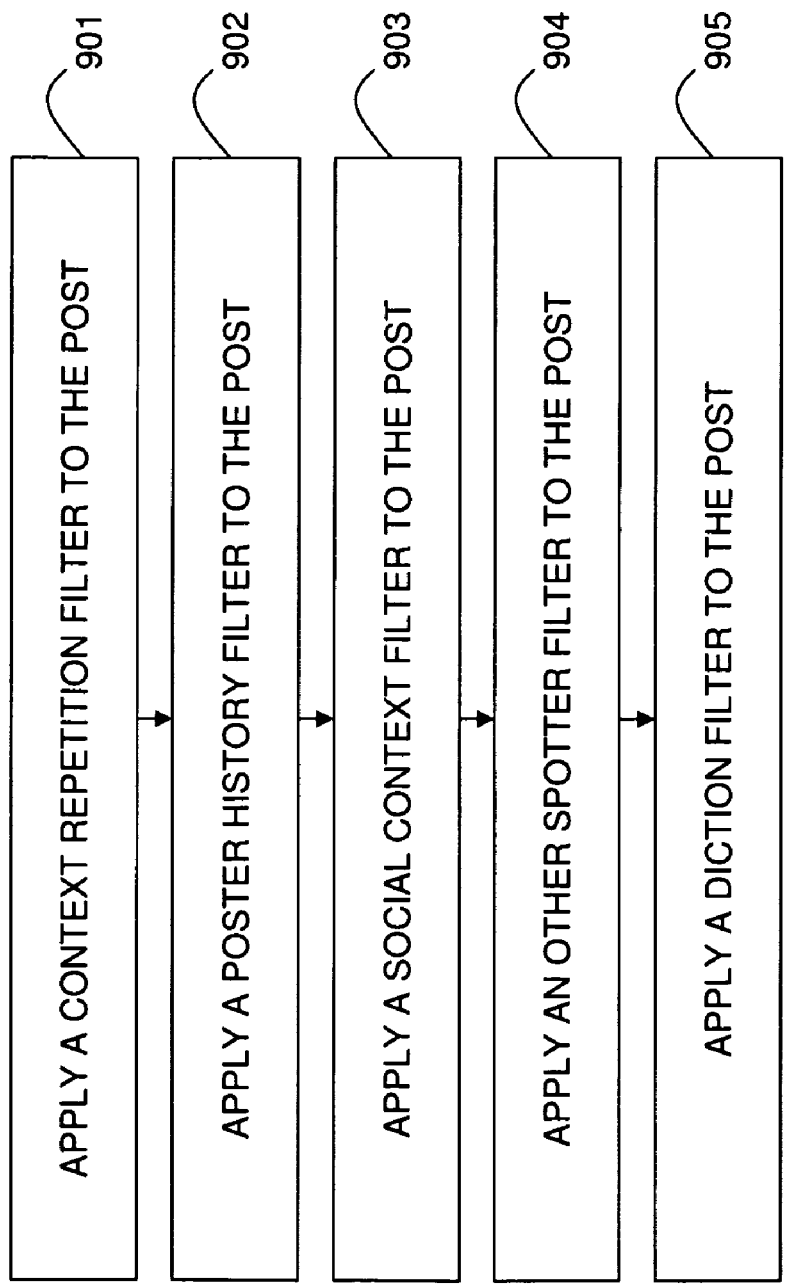
FIG. 9 is a logic flowchart of a method for applying a plurality of context filters to the post illustrated in FIG. 7.

Referring back to FIG. 7, once the content filters are applied to the post in 702, the system applies the context filters to the post in 703. FIG. 9 illustrates an example method for applying a plurality of context filters to the post in 703 of FIG. 7. Beginning at 901, the system applies a context repetition filter to the post. If the same post appears many times, the post is likely to be an advertisement. In one embodiment, the context repetition compares the post to the other posts in the corpus. If the post matches at least a predetermined number of posts in the corpus, then the context repetition filter indicates to the system that the post may be an advertisement.

Proceeding to 902, the system applies a poster history filter to the post. The totality of posts by a poster may indicate whether a poster posts only advertisements. In one embodiment, the poster history filter determines what percentage of all posts from a poster are reported as advertisements. For example, 90% of a poster's posts may be reported by other posters as advertisements. If the percentage is above a predetermined threshold (e.g., 75%), then the filter indicates to the system that the post may be an advertisement. In another embodiment, the filter may review only posts from a poster that are in the corpus or the filter may review a random subset of posts from the poster. In another embodiment, the filter may include an index of poster handles that were previously identified as a bot.

Proceeding to 903, the system applies a social context filter to the post. Additional poster information may assist in determining is a post is relevant. For example, posters who have been active on a forum or website for years probably post relevant posts. In addition, posters with many friends and/or contacts probably post relevant posts. In one embodiment, the social context filter determines if the poster of the post has an account that has been active for a predetermined amount of time (e.g., at least one year) and/or if the account is linked to a predetermined number of friends and/or contacts (e.g., at least twenty friends). If the poster's account meets the threshold(s), then the social context filter indicates to the system that the post may be relevant.

Proceeding to 904, the system applies another spotter filter to the post. In one embodiment, the filter determines if other posters have indicated that the post is relevant. The posters may also identify language in the post that indicates that the post is relevant. In one embodiment, if language is highlighted by posters, the language may be determined to be included in the index for the domain language filter. If posters indicate language in the post as domain language or identify the post as relevant, then the filter indicates to the system that the post may be relevant.

Proceeding to 905, the system applies a diction filter to the post. Posters that use a constrained vocabulary may be bots posting advertisements. Thus, in one embodiment, the filter reviews the language of the posts from the poster. If the posts include less than a predetermined number of unique words compared to the number of posts analyzed (e.g., less than 10 unique words per post), then the filter indicates to the system that the post may be an advertisement.

Referring back to FIG. 7, upon the system applying the context filters to the post in 702, the system attempts to place the post in a category for the corpus based on the results from the filters in 703. In one embodiment, the system applies a vote checker to the totality of the filters to determine which category to place the post (e.g., advertisement, irrelevant non-advertisement, relevant, questionable). In other embodiments, the system may apply a weighted vote checker and/or at least one of the filters may be an absolute. For example, if the poster history filter indicates that the post may be an advertisement, the system may automatically place the post in the advertisement category. In one embodiment, the weighted vote checker may produce a relevancy score. The score may then be compared to predetermined thresholds in order to categorize the post. For example, if a post's relevancy score falls within a first range, then the post is relevant. If the post's relevancy score falls within a second range, then the post is irrelevant.

In one embodiment, posts that are in the advertisement category are removed from the site. Posts in the irrelevant non-advertisement category may also be removed from the site. In another embodiment, posts may be deactivated but still stored on the site for future reference. Alternatively or in addition, the system may process batches of posts simultaneously. For example, the poster history filter may be applied to all posts from a poster in the corpus. In one embodiment, if any of the indexes for the filters are modified or if any of the filters are updated, the system may reevaluate past posts. Alternatively, the system may only analyze new posts, if preferred.

Change Detection and Correction Facilitation for Websites

For semantic analysis, some information from sites ingested by the system is from a scraper. A scraper may pull information from a screen in order to deliver it to a system. For example, stock prices or web posts may be automatically gathered via a scraper. Thus, the scraper may, e.g., through repetition or coding, pull specific information according to its location on a site's display. For example, if a wanted stock price is historically in the right hand corner of a site, the scraper may automatically pull the information based on location on the site.

In addition, many sites are created using a set design and coding theme. For example, Social Networking or public sharing sites that setup personal user pages use a template to create such pages. Thus, the location of specific information on a user page created from a template is generally known, thus allowing coding of a scraper to automatically pull wanted information.

With advancement in technologies and adoption of such technologies, websites undergo changes over time. For example, when Adobe® Flash® was introduced, sites had to be updated in order to take advantage of the new capability. Thus, the layout of information may change over time. If scrapers are unaware of such changes, incorrect information may be pulled from the site and delivered to the system when updates to a website occur. Thus, a need exists for a system to determine if a change to websites occurs and the type and level of change to a website in order to determine how a scraper needs to be reconfigured. For example, a minor change may allow the system to configure the scraper automatically, but a large change may require manual intervention.

Figure 10:
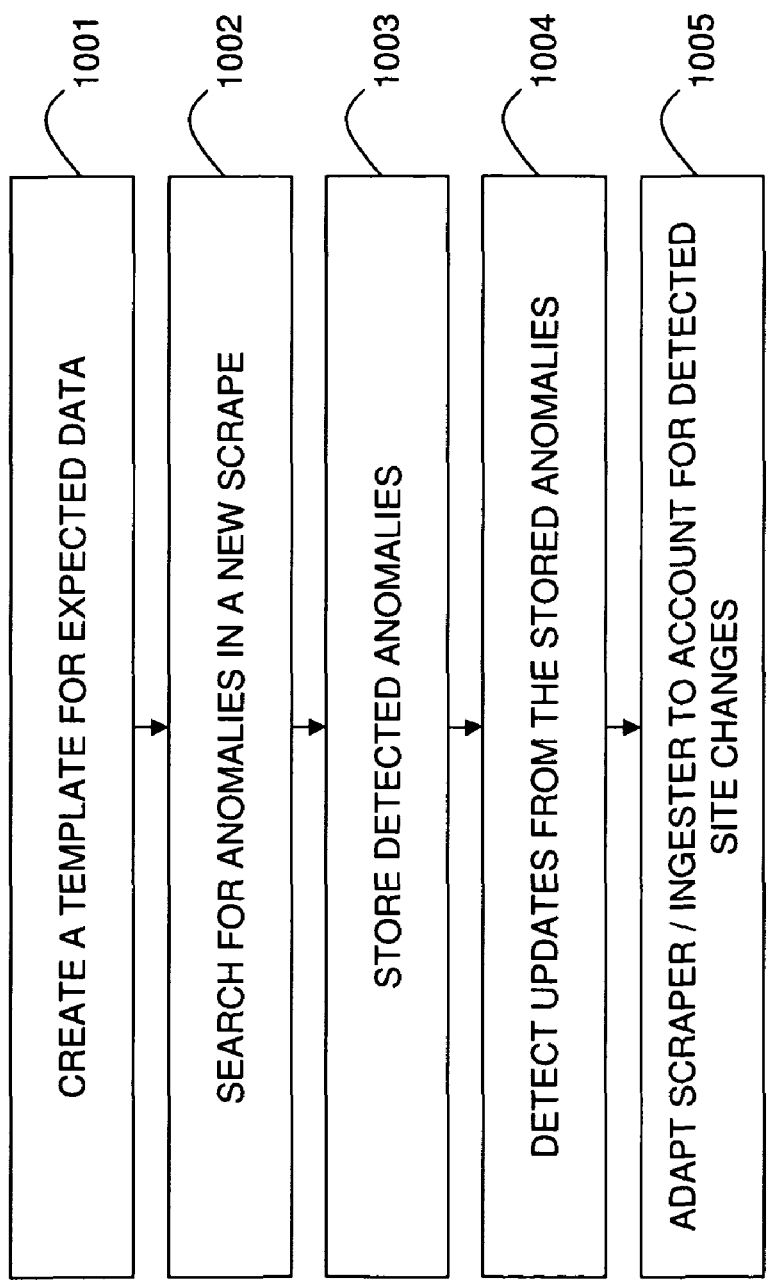
FIG. 10 is a logic flowchart of a method for detecting change to and determining the level of change to a website being scraped.

FIG. 10 illustrates an example method for detecting change and determining the level of change to a site being scraped. Beginning at 1001, the system creates a template for expected data. In one embodiment, the template is the output of the screen scraper. For example, a historical capture of wanted information from a screen scraper may be used as a template to compare future scrapes.

In one embodiment, the template is comprised of at least one of the following:

(i) Metadata. For example, if the metadata of the extracted data is to include a key-value pair of importance containing "artist→pageviews" or "user→comments," the metadata can be compared against the metadata of future extracted data.

(ii) Actuals. For example, if the information of the extracted data is to include a key-value pair of the type "total-artists=100" or "comments-per-page=50," the information can be compared against future extracted data to see if fifty comments exist on the page or 100 artists are listed on the page.

(iii) Rule-Based. The template may include a rule to apply against future extracted data. For example, a rule may be, "find key-value pair of the type 'artist→pageviews,' wherein 'pageviews' is an integer." Thus, the system would determine from the extracted data the number of times an artist's page was viewed.

The templates may be created or updated at system startup and/or during operation after changes are detected to a scrape.

Proceeding to 1002, the system searches for and detects anomalies on a new scrape. An anomaly is a difference between the actual data and the expected data from the extracted information of a new scrape. In one embodiment, the system compares the template created for a site in 1001 to the data of interest from the new scrape for the site. For example, if the template includes the actual that the "comments-per-page=50," and the new scrape includes no comments found, the system would detect an anomaly, since fifty comments is expected.

Template creation and comparison is performed for each page to be scraped. For example, if 100 users of a social networking site are being tracked, 100 user pages are being scraped. Thus, the system would create at least 100 templates and search for anomalies for the 100 user pages.

Proceeding to 1003, the system stores any detected anomalies in 1002. Continuing the previous example, the system stores any anomalies detected for any of the 100 user pages. Proceeding to 1004, the system uses the stored anomalies to detect an update to a website. In one embodiment, the system correlates the anomalies across the plurality of user pages to determine an update. If similar anomalies exist across all pages, the system determines that a major update may exist on the website. If similar anomalies exist across some, but not all user pages, the system determines that a phased rollout of new features or changes on the website may exist. An example of similar anomalies includes if all user pages (or a substantial subset) include no posted comments (wherein comments existed before).

Figure 11:
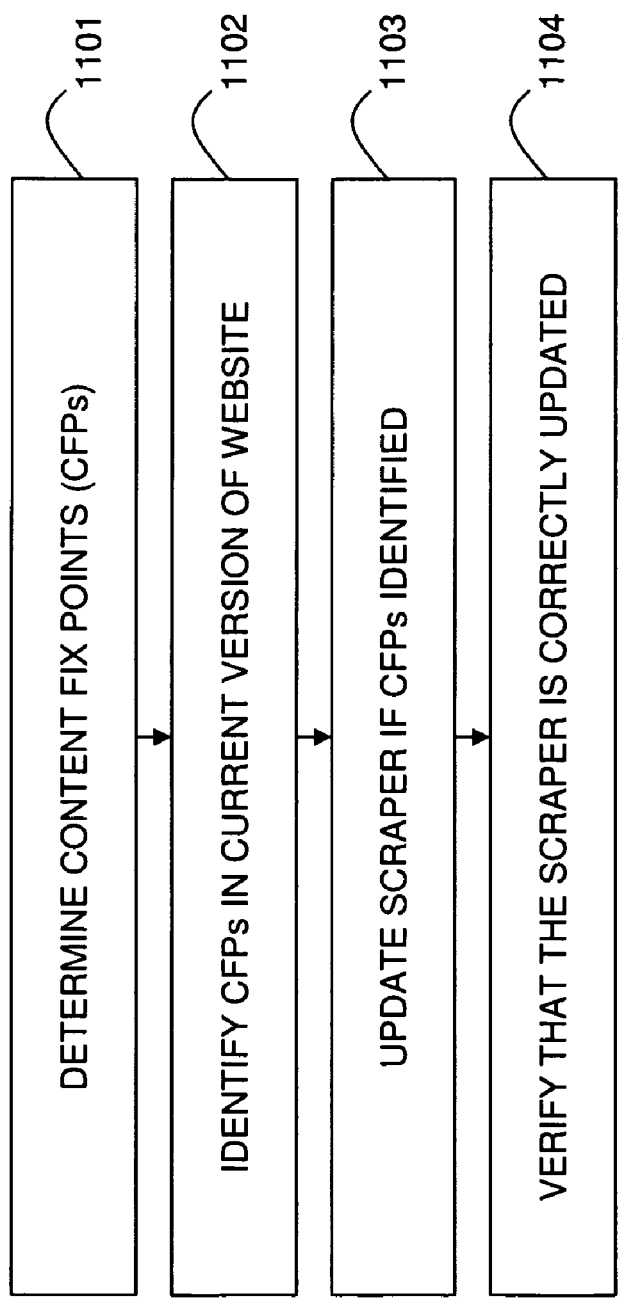
FIG. 11 is a logic flowchart of a method for automatically adapting the screen scraper to account for detected changes to a website as illustrated in FIG. 10.

Proceeding to 1005, the system attempts to adapt the scraper/ingester in order to account for detected updates or changes to the website. FIG. 11 illustrates an example method for automatically adapting the screen scraper to account for detected changes to a website. Beginning at 1101, the system determines content fix points for the website. Content fix points (CFPs) are data on the website that does not change over time. In one embodiment, CFPs are within or close to the extracted data on the website. For example, if stock prices are being extracted from a website by the scraper, a CFP may be the stock symbol or a list of stock symbols being extracted from the page. Thus, if a change in location on the website for the stock prices occurs, the symbols as CFPs can be used by the system to locate the new position of the stock prices.

Another example of CFPs for websites that add or depreciate content, such as discussion boards, are user comments. New users comments may be added to the top of a list, while older comments are pushed further down the page until eventually removed from the page. Thus a CFP as or within a user comment allows the system to track the movement of the user comments when new comments are added to the page. Another example of a CFP is a header for a section of the page being scraped. Thus, for stock prices being scraped, the header of the stock price section may be, e.g., "Today's Stock Market." In one embodiment, a list of CFPs for a website are stored and updated as necessary. Thus, the system does not need to create new CFPs each instance of updating the scraper.

Upon determining CFPs for the website in 1101, the system searches for the CFPs on the current version of the website in 1102. In one embodiment, the system determines a spatial arrangement of the CFPs on the previous version of the website. Thus, the system may determine the approximate clustering of CFPs for data to be scraped. The system then searches for a clustering of the same CFPs on the current version of the website. If the system is unable to identify a clustering of CFPs, then in one embodiment, the system notifies the user that a change was detected, but that the scraper cannot be automatically updated. In another embodiment, the system may determine a different correlation between the CFPs.

Proceeding to 1103, the system updates the scraper if a clustering of CFPs is identified by the system in 1102. In one embodiment, the system modifies the extraction code of the screen scraper to extract information from the new location. Proceeding to 1104, the system verifies that the scraper is correctly updated. In one embodiment, the system detects anomalies, as described above and illustrated in FIG. 10. If the type of content on the website is temporal (e.g., a discussion board), older data may be recrawled (e.g., from older scrapes) to receive a version of old data in the new layout. The updated screen scraper is thus configured to be able to extract the historic entries by comparing with recent data from scrapes.

In one embodiment, the system may be able to update the scraper to account for only portions of the update to the website. Thus, in one embodiment, the system identifies changes to a user that need attention. To illustrate as an example, the system may store an old copy of the content (e.g., scraped user comments) on the previous version of the website. The system then attempts to locate the old content on the current version of the website. A record is created by the system during finding the old content on the current version. The record may be accessed by a user or operator in order to determine changes made to a website.

Upon the system successfully updating the scraper, in one embodiment, the system notifies the user that an update to a website was detected and/or the system updated the scraper to take into account the update to the website.

General

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a," "an" and "the" are intended to include the plural forms as well, unless the context clearly indicates otherwise. Furthermore, as used herein, the terms "comprises," "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

What is claimed is:

1. A system for transforming domain specific unstructured data into structured data, said system comprising:
   a digital processing apparatus executing programs of machine-readable instructions:
   an intake platform operating through said digital processing apparatus, said intake platform comprising:
   an intake acquisition module acquiring structured data, semi-structured data, and associated metadata related to a domain and problem of interest, said intake acquisition module developing baseline data related to said domain and problem of interest from said structured data, semi-structured data, and associated metadata;
   an intake pre-processing module receiving structured and unstructured content related to said domain and problem of interest;
   an intake language module providing word equivalents to words within said structured and unstructured content according to said domain and problem of interest;
   an intake application descriptors module providing definitions of key descriptors within said domain and problem of interest; and
   an intake adjudication module processing said structured and unstructured content using said baseline data, said word equivalents, and said key descriptors to develop a workflow for classifying said structured and unstructured content for said domain and problem of interest; and
   a control platform comprising:
   a control data acquisition module identifying data acquisition and data analysis errors relating to said receiving of said structured and unstructured content and said classifying of said structured and unstructured content;
   a control data consistency collator analyzing states of said data within said workflow to identify state errors;
   a control auditor monitoring sources of said structured and unstructured content and monitoring said data within said workflow to identify source and processing errors;
   a control event definition and policy repository maintaining policies for resolving said data acquisition and data analysis errors, said state errors, and said source and processing errors; and
   an error resolver resolving said data acquisition and data analysis errors, said state errors, and said source and processing errors according to said policies; and
   an output operating through said digital processing apparatus, said intake output outputting results of said workflow, said results of said workflow comprising said structured and unstructured content classified into structured data enabled to be used in data analytics.

2. The system of claim 1, wherein said intake acquisition module is directed to one of websites, forums, feeds and proprietary sources, which provide one of user opinions, behavior and preferences.

3. The system of claim 2, wherein one of said user opinions, behavior and preferences will be supplemented by one of user demographics, domain and application relevant structured and semi-structured repositories are used to provide said baseline data.

4. The system of claim 1, wherein said control data acquisition module provides reporting on one of standard data acquisition layer errors, protocol related error codes, data source response times, semantic extraction failure codes, parsing error codes, data processing error codes, data output integrity checks, data corruption error codes and data consistency.

5. The system of claim 1, wherein said control data consistency collator executes state assertion and associated source accessibility state assertion.

6. The system of claim 1, wherein said control data consistency collator provides one of standardized reporting of acquired data volumes and output data volumes and standardized output integrity checks and standardized acquisition integrity checks, provide a functional state monitoring per processing unit, provide data throughput per processing unit, provide data volume analysis, and provide analytics processing capacity high watermark.

7. The system of claim 1, wherein said control auditor further ensures one of data presence per source, wherein the data presence per source is minimum data volumes expected per source over a specified time increment, data presence per modality, such that there are data consistency checks on expected modalities on a per source basis, data flow volumes, including scalability of the data store and scalability of the cube producing subsystem, data store integrity, including the insertion data flow and throughput, utilization high watermark, capacity and functional state, and post processing data consistency checks.

8. The system of claim 1, wherein said error resolver further comprises a component feedback component that executes advice of said control auditor based on issues having no solutions.

9. A programmable non-transitory storage medium tangibly embodying a program of machine-readable instructions executable by a digital processing apparatus to perform operations of transforming domain specific unstructured and broken language data into structured data for enabling custom data analytics, the operations comprising:
   acquiring structured data, semi-structured data, and associated metadata related to a domain and problem of interest;
   developing baseline data related to said domain and problem of interest from said structured data, semi-structured data, and associated metadata;
   receiving structured and unstructured content related to said domain and problem of interest;
   providing word equivalents to words within said structured and unstructured content according to a domain and problem of interest;

providing definitions of key descriptors within said domain and problem of interest;

processing said structured and unstructured content using said baseline data, said word equivalents, and said key descriptors to develop a workflow for classifying said structured and unstructured content for said domain and problem of interest;

identifying data acquisition and data analysis errors relating to said receiving of said structured and unstructured content and said classifying of said structured and unstructured content;

analyzing states of said data within said workflow to identify state errors;

monitoring sources of said structured and unstructured content and monitoring said data within said workflow to identify source and processing errors;

maintaining policies for resolving said data acquisition and data analysis errors, said state errors, and said source and processing errors;

resolving said data acquisition and data analysis errors, said state errors, and said source and processing errors according to said policies; and outputting results of said workflow, said results of said workflow comprising said structured and unstructured content classified into structured data enabled to be used in data analytics.

10. The programmable non-transitory storage medium of claim 9, wherein said acquiring is further to one of websites, forums and feeds which provide one of user opinions, behavior and preferences.

11. The programmable non-transitory storage medium of claim 10, wherein one of said user opinions, behavior and preferences will be supplemented by one of user demographics, domain and application relevant structured and semi-structured repositories are used to provide said baseline data.

12. The programmable non-transitory storage medium of claim 9, wherein said identifying data acquisition and data analysis errors further provides reporting on one of standard data acquisition layer errors, protocol related error codes, data source response times, semantic extraction failure codes, parsing error codes, data processing error codes, data output integrity checks, data corruption error codes and data consistency.

13. The programmable non-transitory storage medium of claim 9, wherein said analyzing states of said data further executes state assertion and associated source accessibility state assertion.

14. The programmable non-transitory storage medium of claim 9, wherein said analyzing states of said data further provides one of standardized reporting of acquired data volumes and output data volumes and standardized output integrity checks and standardized acquisition integrity checks, provide a functional state monitoring per processing unit, provide data throughput per processing unit, provide data volume analysis, and provide analytics processing capacity high watermark.

15. The programmable non-transitory storage medium of claim 9, wherein said monitoring sources further ensures one of data presence per source, wherein the data presence per source is minimum data volumes expected per source over a specified time increment, data presence per modality, such that there are data consistency checks on expected modalities on a per source basis, data flow volumes, including scalability of the data store and scalability of the cube producing subsystem, data store integrity, such as the insertion data flow and throughput, utilization high watermark, capacity and functional state, and post processing data consistency checks.

16. The programmable non-transitory storage medium of claim 9, wherein said resolving said data acquisition and data analysis errors further executes advice of said control auditor based on issues having no solutions.

17. A programmable non-transitory storage medium tangibly embodying a program of machine-readable instructions executable by a digital processing apparatus to perform operations of transforming domain specific unstructured and broken language data into structured data for enabling custom data analytics, the operations comprising:

acquiring structured data, semi-structured data, and associated metadata related to a domain and problem of interest;

developing baseline data related to said domain and problem of interest from said structured data, semi-structured data, and associated metadata;

receiving structured and unstructured content related to said domain and problem of interest;

providing word equivalents to words within said structured and unstructured content according to a domain and problem of interest;

providing definitions of key descriptors within said domain and problem of interest;

processing said structured and unstructured content using said baseline data, said word equivalents, and said key descriptors to develop a workflow for classifying said structured and unstructured content for said domain and problem of interest;

identifying data acquisition and data analysis errors relating to said receiving of said structured and unstructured content and said classifying of said structured and unstructured content;

analyzing states of said data within said workflow to identify state errors;

monitoring sources of said structured and unstructured content and monitoring said data within said workflow to identify source and processing errors;

maintaining policies for resolving said data acquisition and data analysis errors, said state errors, and said source and processing errors;

resolving said data acquisition and data analysis errors, said state errors, and said source and processing errors according to said policies; and outputting results of said workflow, said results of said workflow comprising said structured and unstructured content classified into structured data enabled to be used in data analytics, wherein said acquiring is further to one of websites, forums and feeds which provide one of user opinions, behavior and preferences, and said user opinions, behavior and preferences are be supplemented by one of user demographics, domain and application relevant structured and semi-structured repositories are used to provide said baseline data.

* * * * *